United States Patent [19]

Itoh

[11] Patent Number: 5,170,196

[45] Date of Patent: Dec. 8, 1992

[54] PORTABLE PROJECTOR

[75] Inventor: Hiroaki Itoh, Chiba, Japan

[73] Assignee: Sony Corporation, Tokyo, Japan

[21] Appl. No.: 800,286

[22] Filed: Nov. 29, 1991

[30] Foreign Application Priority Data

Dec. 3, 1990 [JP] Japan ................... 2-404612

[51] Int. Cl.[5] .............................................. G03B 21/00
[52] U.S. Cl. ..................................... 353/122; 353/43; 353/119
[58] Field of Search .................. 353/122, 43, 100, 101, 353/119, DIG. 3, 35, 22-24; 40/362, 366, 367; 352/242, 243

[56] References Cited

U.S. PATENT DOCUMENTS

| | | | |
|---|---|---|---|
| 2,764,058 | 9/1956 | Ellis | 353/43 |
| 3,078,761 | 2/1963 | Zorn | 353/43 |
| 3,539,798 | 11/1970 | Perry | 353/43 |
| 4,390,257 | 6/1983 | Fernekes et al. | 40/367 |
| 4,756,614 | 7/1988 | Kato et al. | 353/43 |
| 4,976,429 | 12/1990 | Nagel | 353/122 |

FOREIGN PATENT DOCUMENTS 2441866  7/1980  France ................... 353/43

*Primary Examiner*—William A. Cuchlinski, Jr.
*Assistant Examiner*—William C. Dowling
*Attorney, Agent, or Firm*—Lewis H. Eslinger; Jay H. Maioli

[57] ABSTRACT

A portable projector which can be used at a location where no commercial ac power source is available and can be carried readily, has a battery section for supplying power therefrom, an illuminating section including a lamp for receiving power from the battery section and emitting light therefrom, a picture image holding section for forming a picture image thereon and for being irradiated by light emitted from the irradiating section to pass the light in accordance with the picture image formed thereon, and a lens section for enlarging a picture image of light passing through the picture image holding section. The battery section, illuminating section, picture image holding section and lens section can be removably coupled on a common optical axis to each other.

3 Claims, 4 Drawing Sheets

PORTABLE PROJECTOR

BACKGROUND OF THE INVENTION

1. Field of the Invention

This invention relates to a portable projector which can project a picture image onto a screen at a location where a commercial ac power source is not available and which can be carried in a disassembled condition.

2. Description of the Prior Art

Projectors of the type have been developed lately which project a picture image onto a screen using a liquid crystal display panel which is driven by a video signal.

Conventional projectors of the type just mentioned normally employ a commercial ac power source. Accordingly, they are very inconvenient when desired to be used outdoors.

Meanwhile, a long vacation has been popular in recent years, and such a chance has significantly increased that a family goes auto camping or goes to a mountain cottage. Accordingly, if a video film photographed in the daytime or a picture film can be projected onto a large size screen so that all members may enjoy, then the outing will be much more pleasant. However, since a conventional projector employs a commercial ac power source, it cannot be used in such outing.

Further, a conventional projector is constructed as a unit and cannot easily be disassembled. Accordingly, it is bulky and inconvenient to carry.

SUMMARY OF THE INVENTION

It is an object of the present invention to provide a portable projector which can be used at a location where no commercial ac power source is available and which can be carried readily.

In order to attain the object, according to the present invention, there is provided a portable projector which comprises a battery section for supplying power therefrom, an illuminating section including a lamp for receiving power from the battery section and emitting light therefrom, a picture image holding section for forming a picture image thereon and for being irradiated by light emitted from the irradiating section to pass the light in accordance with the picture image formed thereon, a lens section for enlarging a picture image of light passing through the picture image holding section, and coupling means for removably coupling the battery section, illuminating section, picture image holding section and lens section on a common optical axis to each other.

With the portable projector, light to irradiate upon the picture image holding section is emitted from the illuminating section including the lamp which is lit by a dc voltage from the battery section. Accordingly, the portable projector can be used even where no commercial ac power is available. Further, since the battery section, illuminating section, picture image holding section and lens section are removably coupled to each other, when the portable projector is to be carried, they can be accommodated in a well-arranged condition into a bag or like, and consequently, the portable projector can be carried compactly and readily.

The above and other objects, features and advantages of the present invention will become apparent from the following description and the appended claims, taken in conjunction with the accompanying drawings.

DETAILED DESCRIPTION OF THE PREFERRED EMBODIMENT

Figure 1:
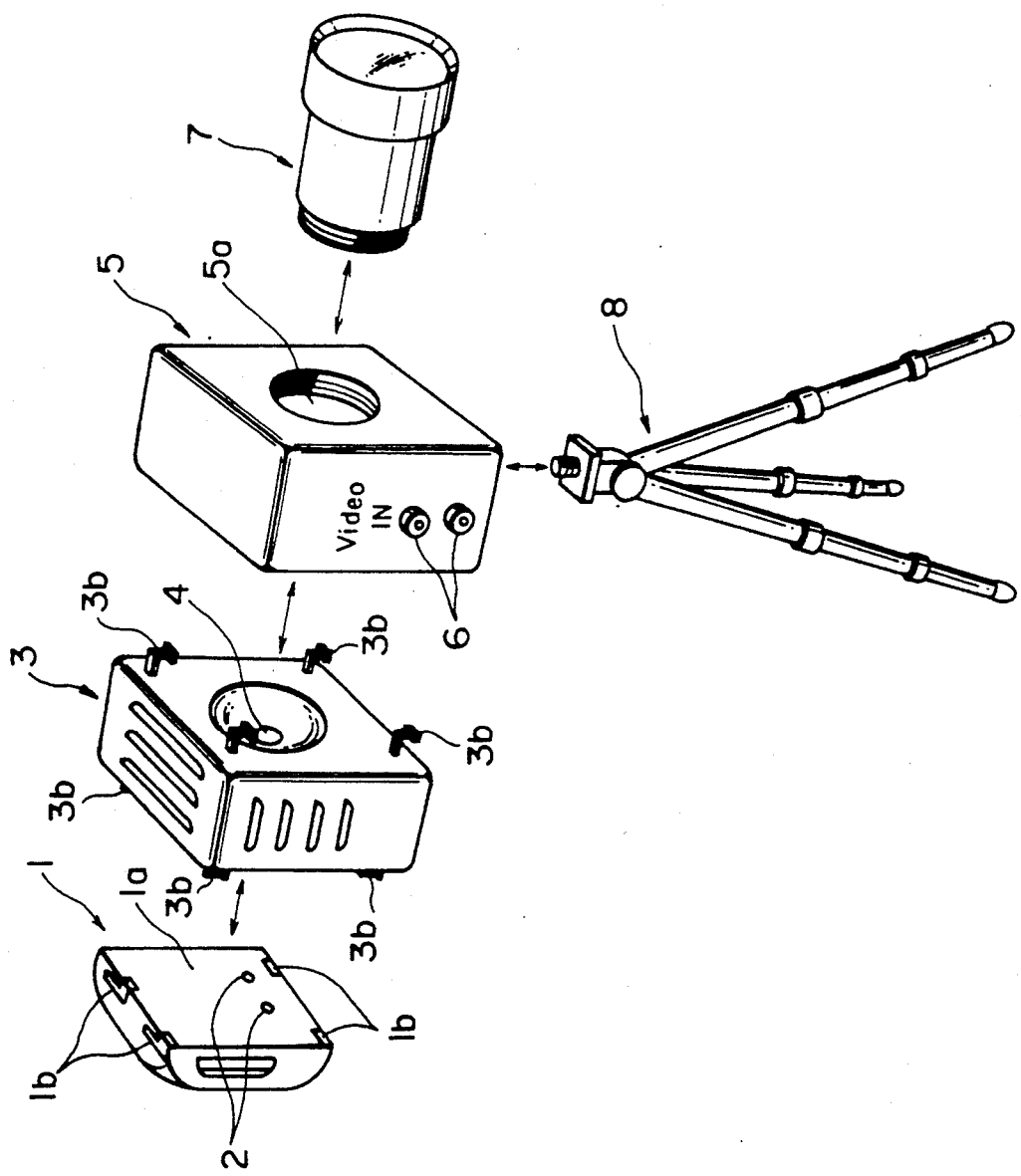
FIG. 1 is an exploded perspective view of a portable projector showing a preferred embodiment of the present invention.

Referring first to FIG. 1, there is shown in an exploded perspective view a portable projector according to a preferred embodiment of the present invention. The portable projector shown includes a battery pack 1 serving as a battery section for generating a predetermined dc voltage. A pair of electrodes 2 are provided on a front wall 1a of the battery pack 1. The portable projector further includes a lamp unit 3 serving as an illuminating section and having a lamp 4 mounted thereon. When the battery pack 1 is mounted on a rear face of the lamp unit 3, the electrodes 2 thereon are closely contacted with and electrically connected to a pair of electrodes (not shown) provided on the rear face of the lamp unit 3 so that the lamp 4 may be energized to emit light forwardly therefrom.

Figure 2:
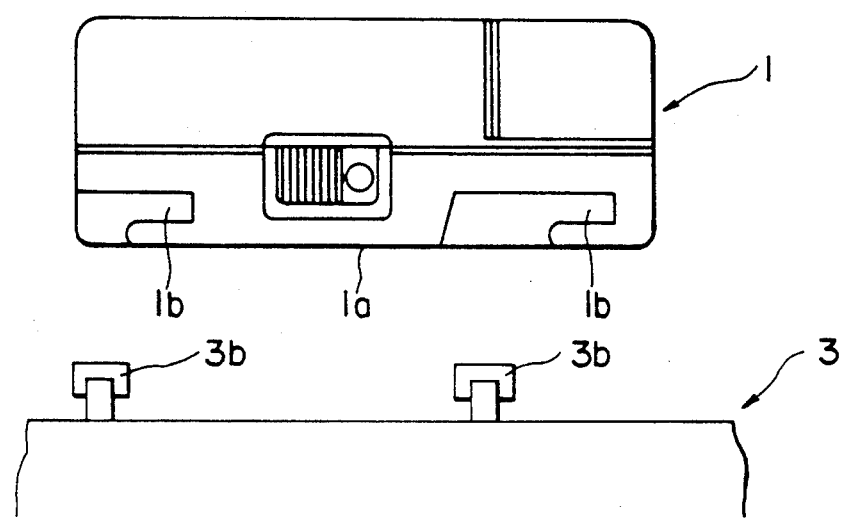
FIG. 2 is a plan view showing a coupling structure of different components of the portable projector of FIGS. 1.

Referring also to FIG. 2, a pair of L- or hook-shaped arresting grooves 1b are formed at each of upper and lower ends of the front wall 1a of the battery pack 1. Meanwhile, two pairs of pawl elements 3b are provided on the lamp unit 3. Thus, the battery unit 1 is mounted on the lamp unit 3 with the pawl elements of the latter engaged in the arresting grooves 1b of the former.

The portable projector further includes a liquid crystal panel unit 5 serving as a picture image holding section and mounted in a coaxial relationship, that is, on a common optical axis on the lamp unit 3 by means of a coupling structure similar of the coupling structure between the battery pack 1 and lamp unit 3. A pair of terminals 6 are provided on side wall of the liquid crystal panel unit 5, and a liquid crystal display panel (not shown) provided in the inside of the liquid crystal panel unit 5 is driven by a video signal which is inputted by way of the terminals 6. A threaded hole 5a is formed in a front wall of the liquid crystal panel unit 5, and a lens section 7 is removably screwed into the threaded hole 5a. Another threaded hole (not shown) is formed in a bottom wall of the liquid crystal panel unit 5, and a tripod 8 is removably threaded into the threaded hole and secured to the liquid crystal panel unit 5.

The battery pack 1, lamp unit 3, liquid crystal panel unit 5 and lens section 7 are removably mounted relative to each other in a coaxial relationship, that is, on a common optical axis. The tripod 8 is removably mounted on the liquid crystal panel unit 5.

Figure 3:
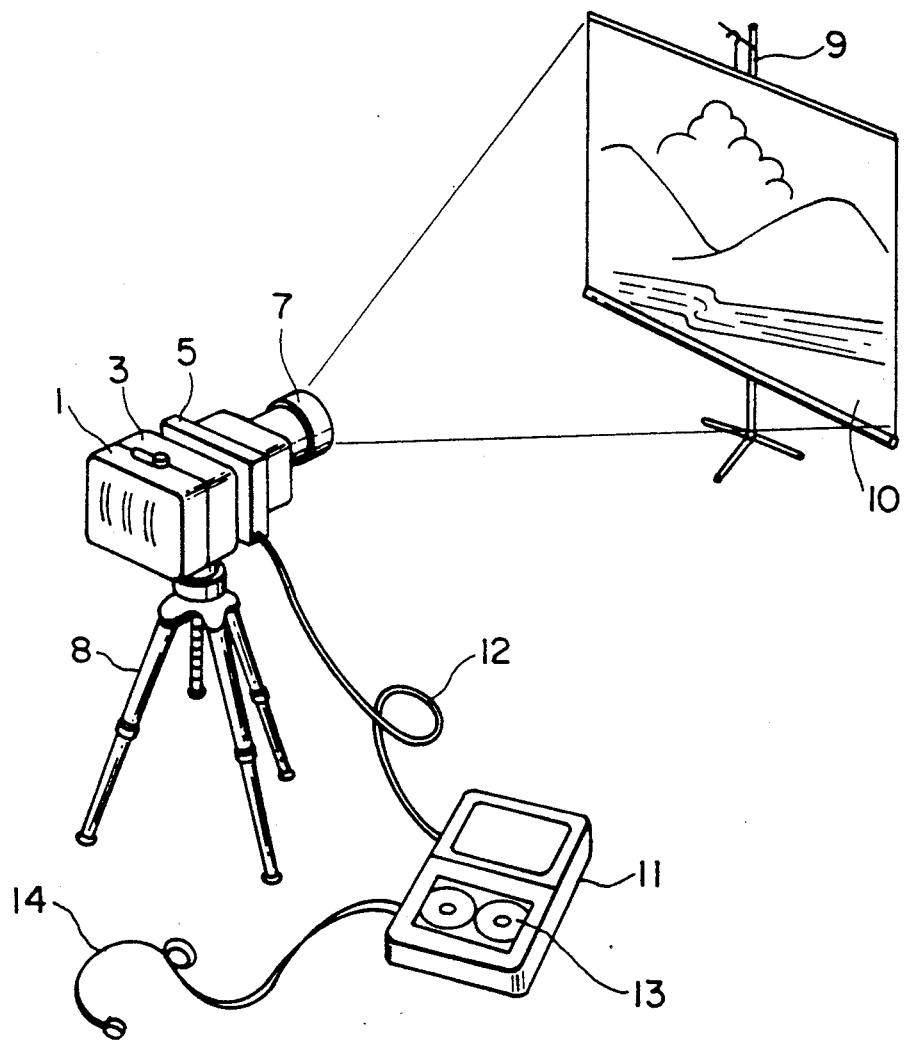
FIG. 3 is a perspective view illustrating a manner of use of the portable projector of FIG. 1.

The portable projector having such construction as described above is used in such a manner as, for example, shown in FIG. 3. Referring to FIG. 3, the battery pack 1, lamp unit 3, liquid crystal panel unit 5 and lens section 7 are coupled to each other in a coaxial relationship into a single block. Then, the block is secured at the liquid crystal panel unit 5 thereof to the tripod 8 and installed in an opposing relationship to a screen 10 which is supported on a stand 9 located at a suitable distance from the portable projector. Then, a cable 12 of a video deck 11 is connected to the terminals 6 of the liquid crystal panel unit 5, and then the lamp unit 3 is lit and the video deck 11 is rendered operative.

Thus, a picture image signal of a video tape 13 loaded in the video deck 11 is inputted to the liquid crystal display panel in the liquid crystal panel unit 5 so that a picture image is formed on the liquid crystal display panel. The liquid crystal display panel is irradiated by the light emitted from the lamp unit 3, and the light passes through the liquid crystal display panel in accordance with the thus formed picture image. Light of the picture image is then introduced into the lens section 7, and consequently, the picture image is enlarged by the lens section 7 and then projected onto the screen 10.

Figure 4:
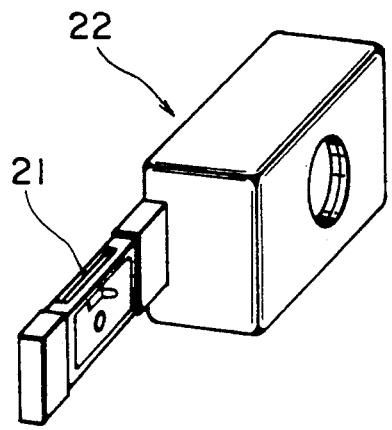
FIG. 4 is a perspective view showing a slide unit which may be used with the portable projector of FIG. 1.

The portable projector is constructed such that a slide unit 22 on which a color film 21 is loaded as shown in FIG. 4 can be used in place of the liquid crystal panel unit 5. Further, a headphone 14 may be employed as seen in FIG. 3 in order to enjoy sounds.

Figure 5:
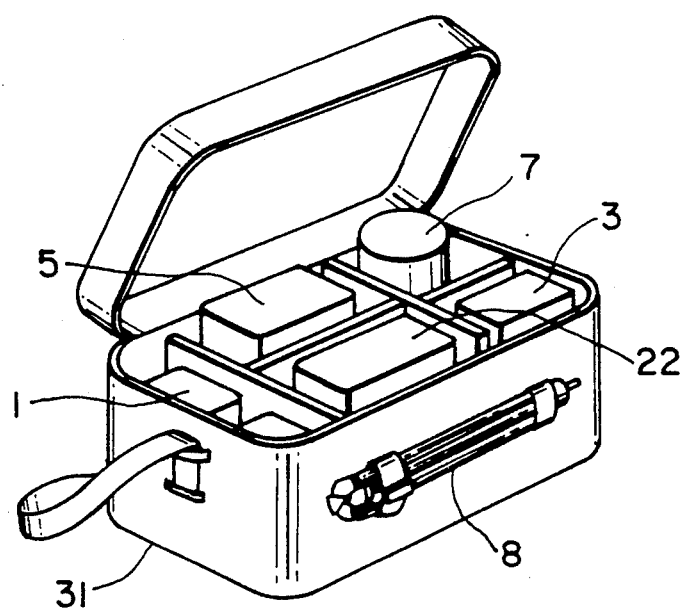
FIG. 5 is a perspective view showing several components of the portable projector of FIG. 1 accommodated in a bag.

When the portable projector is to be carried, the battery pack 1, lamp unit 3, liquid crystal panel unit 5 or slide unit 22 and lens section 7 will be disassembled from each other and acommodated in a well-arranged condition into a carrying bag 31 in such a manner as, for example, shown in FIG. 5. Meanwhile, the tripod 8 will be attached, with legs thereof contracted, to a side face of the carrying bag 31.

The portable projector described above can thus be used even at a camping site where no commercial ac power source is available, and a user thereof can enjoy a video film of a large screen by simple operation. Further, since the several components thereof can be disassembled from each other, they can be carried readily in a compact condition by disassembling them from each other and accommodating them in a well-arranged condition into a bag or the like.

Having now fully described the invention, it will be apparent to one of ordinary skill in the art that many changes and modifications can be made thereto without departing from the spirit and scope of the invention as set forth herein.

What is claimed is:

1. A portable projector, comprising:

a battery section for supplying power therefrom;

an illuminating section including a lamp for receiving power from said battery section and emitting light therefrom;

a picture image holding section including a liquid crystal panel section in which a liquid crystal display panel is accommodated for forming a picture image thereon and for being irradiated by light emitted from said irradiating section to pass the light in accordance with the picture image formed thereon;

means-mounted on said picture image holding section for receiving an external video signal and feeding said signal to said liquid crystal panel section;

a lens section for enlarging a picture image of light passing through said picture image holding section; and coupling means for removably coupling said battery section, illuminating section, picture image holding section and lens section on a common optical axis to each other.

2. A portable projector according to claim 1, wherein said battery section and irradiating section have pairs of terminals which are connected to each other to allow power from said battery section to be supplied to said lamp when said battery section and irradiating section are coupled to each other.

3. A portable projector according to claim 1, wherein said coupling means at each coupling location between said battery section, said illuminating section, and said picture image holding section comprise two pairs of hook-shaped arresting grooves and two pairs of pawls arranged to fit into and be held by respective ones of said arresting grooves.

* * * * *